Patented Mar. 25, 1952

2,590,571

UNITED STATES PATENT OFFICE 2,590,571

PREPARATION OF STABILIZED TALL OIL AMINES

Stearns T. Putnam, Wilmington, Del., assignor to Hercules Powder Company, Wilmington, Del., a corporation of Delaware No Drawing. Application March 7, 1950, Serial No. 148,260

8 Claims. (Cl. 260—97.5)

This invention relates to stabilized tall oil amines substantially free of emulsion polymerization inhibitors and to the method for producing such amines.

It is known that tall oil amines can be prepared by catalytically converting tall oil into the nitrile and subsequently hydrogenating the nitrile in the same manner as rosin amines are prepared from rosin. Not only are the yields low for the known processes of preparing tall oil amines and rosin amines, but the products are also deficient particularly with respect to their utility as cationic emulsifiers in peroxide-catalyzed emulsion polymerization processes.

Now in accordance with this invention, it has been found that the amine of a stabilized tall oil may be obtained in excellent yields from the stabilized tall oil nitriles, namely, the nitrile of hydrogenated tall oil or the nitrile of dehydrogenated (disproportioned) tall oil, which are substantially free of abietonitrile, by contacting such a stabilized tall oil nitrile with hydrogen, under hydrogenation conditions, in the presence of an active hydrogenation catalyst until sufficient hydrogen is absorbed for the conversion of all of the nitrile groups to amino groups. It has further been found that the amines of stabilized tall oil which are prepared by the present process from stabilized tall oil nitriles substantially free of abietonitrile are substantially free of abietylamine and are also substantially free of inhibitors of peroxide-catalyzed polymerization reactions and thus have outstanding properties which favor their use as cationic emulsifying agents in peroxide-catalyzed emulsion polymerizations.

The following examples are illustrative of the method of producing amines of hydrogenated and dehydrogenated tall oil in accordance with this invention. All parts and percentages are by weight unless otherwise indicated.

EXAMPLE I

One hundred seventy-five parts of the nitrile of a hydrogenated tall oil having a boiling point of 154°–200° C. at 1–2 mm. and showing by ultraviolet absorption analysis no detectable abietyl compounds, 161 parts of anhydrous ammonia, and 35 parts of a Raney nickel catalyst were placed in a stainless steel high pressure bomb. Hydrogen was admitted to a pressure of 3200 pounds per square inch and the mixture was heated to 117° C. and held at that temperature for 2.75 hours. After cooling, the product was filtered to remove the catalyst. The product was a white crystalline mass equal to 172 parts substantially free of abietyl compounds and emulsion polymerization inhibitors and contained 4.56% nitrogen and had a neutral equivalent of 295. This represents a conversion of 98.5% which is equivalent to an overall productivity of 0.83 pound of amine per pound of hydrogenated tall oil.

EXAMPLE II

Two hundred parts of the nitrile prepared from a dehydrogenated tall oil and having a boiling point of 150°–200° C. at 1–2 mm. and containing no abietyl compounds detectable by ultraviolet absorption analysis, 150 parts of anhydrous ammonia and 40 parts of a Raney nickel catalyst were placed in a stainless steel high pressure bomb. Hydrogen was admitted to a total pressure of 3200 pounds per square inch and the mixture was heated to 120° C. and held at that temperature for 3.75 hours. The bomb was cooled and the mixture was filtered to remove the catalyst. The product was a tan crystalline mass equal to 188 parts, contained 4.57% nitrogen, showed no abietyl compounds by ultraviolet absorption, and was substantially free of emulsion polymerization inhibitors. It had a neutral equivalent of 300. This corresponds to a conversion of 94% which is equivalent to an overall productivity of 0.705 pound of amine per pound of dehydrogenated tall oil.

EXAMPLE III

Two hundred twenty-five parts of the nitrile prepared from a dehydrogenated tall oil and having a boiling point of 192°–245° C. at 13 mm., and 45 parts of a Raney nickel catalyst were placed in a stainless steel high pressure bomb. Hydrogen was admitted to a total pressure of 3000 pounds per square inch and the mixture was heated at 100° C. for 2.25 hours, at 120° C. for 6.5 hours and finally at 140° C. for 1 hour. The product was washed out of the bomb with hexane, filtered and the catalyst washed first with hexane and then with alcohol. The solvents were removed by distillation and 215 parts of the amine containing 4.28% nitrogen and having a neutral equivalent of 341, were obtained. This corresponds to a conversion of 95%.

EXAMPLE IV

A sample of industrial tall oil containing by ultraviolet absorption analysis about 15% abietic acid was disproportionated by heating with 1 part 5% palladium-on-carbon catalyst per 400 parts tall oil at 260° C. for 4.5 hours until the ultraviolet absorption analysis showed the absence of abietic acid which indicated complete disproportionation of the abietic acid. The yield was substantially quantitative. This disproportionated tall oil after filtration to remove the disproportionation catalyst was then treated with ammonia at 320° C. for 10 hours in the absence of a catalyst. The crude disproportionated tall oil nitrile was distilled at 4 mm. pressure and the portion boiling at 186°–220° C. constituting 65% of the crude disproportionated tall oil nitrile was taken as the nitrile fraction. It had by analysis 4.7% nitrogen.

Hydrogenated tall oil was made from another sample of the same batch of industrial tall oil by hydrogenating the distilled tall oil with hydrogen at 5000 pounds per square inch in the presence of Raney nickel catalyst at 225° C. for one hour. The resulting hydrogenated tall oil had a bromine number of 48 and was substantially free of abietic acid as far as could be determined from ultraviolet absorption analysis. The nitrile was made from the resulting hydrogenated tall oil by passing ammonia through the hydrogenated tall oil with good dispersion at 330°±5° C. for 4 hours. The resulting crude product was distilled to obtain a hydrogenated tall oil nitrile having a 4.8% nitrogen content.

A tall oil nitrile was made from the same batch of industrial tall oil following the procedure of U. S. 2,023,337 using a silica gel catalyst in a tube at 330°–392° C. A charge of crude tall oil nitrile containing 3.8% nitrogen and about 10% abietyl compounds by ultraviolet absorption analysis was obtained and this was fractionated at 1 mm. pressure in a spinning band column of very low pressure drop to separate the nitrile fraction. The cuts richest in nitrile boiled at 151°–161° C. and the higher boiling cuts were becoming increasingly greater in acid number. The cuts boiling at 151°–161° C. amounted to 24% of the charge. They were combined and washed with 2 g. potassium hydroxide dissolved in 75 ml. alcohol to remove acids.

A sample of each of the nitriles described above was hydrogenated to the amine. The tall oil nitrile was hydrogenated by heating 100 parts tall oil nitrile prepared as above from ordinary tall oil with 20 parts Raney nickel catalyst at 100°–150° C. under 500 pounds per square inch hydrogen pressure until sufficient hydrogen was absorbed to reduce the nitrile group to the amine group. The tall oil amine obtained is designated IVa in the test data given in Table 1. Hydrogenated tall oil nitrile and dehydrogenated tall oil nitrile prepared as described above were similarly reduced to hydrogenated tall oil amine and dehydrogenated tall oil amine. These amines are designated IVb and IVc, respectively, in the test data given in Table 1.

Comparative test were made on the use of these amines as an emulsifier for butadiene-styrene copolymerization in a standard peroxide-catalyzed polymerization system to determine the speed of polymerization as an indication of the presence of inhibitors and the relative value of the amine as an emulsifier for these systems. The advantage of these stabilized tall oil amine emulsifiers over conventional sodium resinate emulsifiers is also given by a comparative example. The sodium resinate used was the sodium salt of a dehydrogenated rosin substantially free of sodium abietate and was made by neutralizing with sodium hydroxide commercial dehydrogenated rosin taken at random from a commercial lot used in manufacture of the sodium resinate used commercially by emulsion polymerization plants. The following emulsion system was used:

| | Parts |
|---|---|
| Emulsifier (water free basis) | 4.6 |
| Water | 180.0 |
| Styrene | 29.0 |
| Butadiene | 71.0 |
| Mercaptan modifier | 0.5 |
| Potassium persulfate | 0.3 |

The mercaptan modifier was a commercial lauryl mercaptan containing chiefly lauryl mercaptan. The amine type emulsifiers were neutralized with part of the water containing sufficient acetic acid to neutralize the amine and bring the solution to a pH of 5, and the remaining water was added subsequently. The sodium resinate emulsifier was made by neutralizing the dehydrogenated rosin with sodium hydroxide in part of the water and the remaining water was added subsequently. The components of the above formulation were combined in sealed containers and shaken at 50° C. for about 14 hours and samples were taken at various intervals for analysis for water-insoluble solids. The results are tabulated in Table 1, the yields in most cases being an average of duplicates.

Table 1

| Amine | Emulsifier | Percent Yield of Polymer After Designated Times (hours) | | | | | | |
|---|---|---|---|---|---|---|---|---|
| | | 2.8 hr. | 4.1 hr. | 5.3 hr. | 8.9 hr. | 12.0 hr. | 15.2 hr. | 16.0 hr. |
| IVa | Tall oil amine salt | 9 | | 16 | 20 | | 18 | |
| IVb | Hydronegated tall oil amine salt | | 59 | | | 86 | | 92 |
| IVc | Dehydrogenated tall oil amine salt | 32 | 49 | 67 | 81 | 82 | | 91 |
| | Dehydronegated rosin salt | | 15 | | 33 | | 57 | 80 |

These test results are of the type used in testing emulsifiers commercially and they indicate that tall oil amine prepared from tall oil nitrile and containing substantial amounts of abietylamine is worthless as an emulsifier, and that the stabilized tall oil amines substantially free of abietylamine are excellent emulsifiers and are superior to dehydrogenated rosin in the form of its sodium salt which is a commercial standard in the present day polymerization process.

In order to obtain a hydrogenated tall oil amine or dehydrogenated tall oil amine having the outstanding utility in emulsion polymerization and to obtain the optimum yield in its preparation, the stabilized tall oil nitrile used in the hydrogenation process must be substantially free of abietonitrile. Abietonitrile is objectionable since under the conditions of hydrogenation, it is converted into abietylamine, which, as shown above, inhibits the polymerization in emulsion polymerization systems almost completely. For use in emulsion polymerization, the stabilized tall oil amine preferably contains no detectable amount of abietylamine.

The nitriles from which the amines are prepared in accordance with this invention are obtained by heating hydrogenerated or dehydrogenated tall oil with ammonia. The reaction may be carried out by passing gaseous ammonia into the liquid hydrogenated or dehydrogenated tall oil and removing the water of the reaction as fast as it is formed. They may also be prepared by heating the hydrogenated or dehydrogenated tall oil with ammonia in the presence of a dehydration catalyst. Preferably, the nitriles should be purified by neutralization and distillation before subjecting them to the hydrogenation reaction in accordance with this invention as the presence of acidic materials may destroy the hydrogenation catalyst and cause a low yield of amine.

In the conversion of stabilized tall oil acids into the corresponding nitriles by reaction with ammonia at temperatures within the range of about 250°–350° C., abietyl compounds, if present in small amounts below about 3%, are not detectable and apparently have disappeared and are not to be found in the product as abietonitrile. The disappearance is attributed to known side reactions of abietic acid such as polymerization, decarboxylation, or condensation of ammonia with the double bonds of the abietyl compound. Under these same conditions of preparing stabilized tall oil amines from tall oil, the inhibitors of polymerization also disappear. The conversion of abietic acid in the stabilized tall oil into higher molecular weight products will cause a reduction in yield on distillation of the product. However, the by-products if left in the product do not detract from the usefulness of the stabilized tall oil nitrile for conversion into a stabilized tall oil amine substantially free of abietylamine and useful as an emulsifier in emulsion polymerization in peroxide-catalyzed systems.

The dehydrogenated tall oil, which is converted to the nitrile and then to the amine, is prepared by the dehydrogenation or disproportionation of tall oil by contacting tall oil at an elevated temperature with an active hydrogenation catalyst in the absence of added hydrogen to effect dehydrogenation or disproportionation reaction. Catalysts such as palladium, platinum, nickel, copper chromite, etc., are suitable. The catalysts may be supported on a carrier such as granular alumina, fibrous asbestos or activated charcoal. Dehydrogenation or disproportionation with a palladium catalyst, for example, may be conducted either by a batchwise or a continuous procedure. Thus the tall oil may be agitated with about 5% to about 20% by weight of a palladium catalyst supported on activated carbon (1–2% palladium), at about 150° C. to about 300° C. for about 1 hour to about 5 hours until it is substantially free of abietic acid. In the continuous process the tall oil flows over the supported palladium catalyst at a temperature within the range of about 225° C. to about 300° C. to provide a contact time of about ¼ hour to about 1 hour.

The hydrogenated tall oil, which is converted to the nitrile and then to the amine, is obtained by reducing the unsaturation of tall oil by contacting the tall oil in a fluid stage with hydrogen in the presence of an active base metal hydrogenation catalyst such as activated nickel, Raney nickel, copper chromite, cobalt, etc., under pressure, for example a hydrogen pressure of 200 to 15,000 pounds per square inch and at a temperature of about 125° C. to about 225° C. for about ½ hour to about 5 hours under which conditions it is substantially freed of abietic acid. A highly active platinum or palladium oxide catalyst may also be employed, in which case the reaction is usually carried out at room temperature under a relatively low hydrogen pressure and in the presence of an inert reaction medium such as acetic acid. Many other variations of the hydrogenation reaction may be utilized.

The hydrogenation of the stabilized tall oil nitriles may be carried out in a batch or a continuous process. In the batch process, about 5% to about 20% of the catalyst based on the nitrile may be used. Any active hydrogenation catalyst may be used for the reaction in accordance with this invention as, for example, an active base metal catalyst such as nickel, cobalt, Raney nickel, Raney cobalt, etc., or a noble metal catalyst such as active platinum, palladium, palladium on carbon, or reduced platinum oxide. However, the nickel and cobalt catalysts are preferred since these catalysts give higher yields in the hydrogenation reaction in accordance with this invention.

The hydrogenation reaction may be carried out at a pressure of from about 200 to about 8,000 pounds per square inch. When using a Raney nickel or a Raney cobalt catalyst, a pressure of about 2,000 to about 3,500 pounds per square inch is usually preferable. The hydrogenation of the stabilized tall oil nitriles to amines may be carried out at temperatures of about 20° C. to about 200° C. and preferably at about 50° C. to about 150° C.

The hydrogenation reaction in accordance with this invention for the conversion of the nitriles to the amines may be carried out in the presence of a solvent if desired, but is readily carried out in the absence of a solvent. In the hydrogenation of fatty acid nitriles, the hydrogenation reaction must be carried out in the presence of ammonia in order to prevent the formation of secondary amines. However, in the hydrogenation of the stabilized tall oil nitriles in accordance with this invention, the presence of ammonia is not necessary as may be seen from the foregoing examples. It may be used, however, as a convenient diluent for the reaction.

The stabilized tall oil amines may be recovered from the reaction mixture by filtering while warm to remove the catalyst or by the addition of a suitable solvent followed by filtration and removal of the solvent. For many purposes the amine so obtained may be used directly. Where a more highly refined product is desired, it may be purified by distillation under reduced pressure or by salt formation or by other means.

Since tall oil is a mixture of fatty acids and resin acids, the terms "tall oil nitrile" and "tall oil amine" used herein are defined to mean the nitrile and amine mixtures obtained by converting the —COOH groups of the tall oil acids in the mixture to the —CN and —$CH_2NH_2$ groups, respectively. Thus a tall oil nitrile, or a stabilized tall oil nitrile, is the nitrile formed by converting the carboxyl (—COOH) groups of tall oil or a stabilized tall oil, respectively, into nitrile (—CN) groups and a tall oil amine or a stabilized tall oil amine is the amine formed by converting the nitrile (—CN) groups of tall oil nitrile or a stabilized tall oil nitrile, respectively, into the corresponding amines having —CH₂NH₂ groups in place of the —CN groups of the corresponding nitriles or in place of the —COOH group of the corresponding tall oil or stabilized tall oil from which the amine was ultimately derived. In line with this definition, a dehydrogenated or disproportionated tall oil nitrile or amine is a mixture of nitriles or amines in which the hydrocarbon part of the molecules is the same as the hydrocarbon part of the molecules in dehydrogenated or disproportionated tall oil. A similar relationship holds for hydrogenated tall oil nitrile and amine and hydrogenated tall oil on one hand, and for tall oil nitrile and amine, and tall oil on the other.

The hydrogenated and dehydrogenated tall oil amines are particularly valuable since they combine the properties of both the fatty acid amines and the resin acid amines. Although the stabilized tall oil amines are of outstanding value as the emulsifier in emulsion polymerization processes, they are also of value in the preparation of germicides, disinfectants, detergents, emulsifying agents, wetting agents, and flotation agents. They are also useful as chemical intermediates for the preparation of salts, quaternary salts, amides, ureas, thioureas, disulfides, secondary amines, isocyanides, isocyanates, etc.

This application is a continuation-in-part of copending application Serial No. 714,665, filed December 6, 1946, now abandoned.

What I claim and desire to protect by Letters Patent is:

1. An amine of a stabilized tall oil, suitable for use in cationic emulsification of peroxide-catalyzed emulsion polymerization systems, of the group consisting of hydrogenated tall oil amine and dehydrogenated tall oil amine, said amines being substantially free of emulsion polymerization inhibitors and abietylamine.

2. As a new composition of matter suitable for use in cationic emulsification of peroxide-catalyzed emulsion polymerization systems, hydrogenated tall oil amine substantially free of emulsion polymerization inhibitors and abietylamine.

3. As a new composition of matter suitable for use in cationic emulsification of peroxide-catalyzed emulsion polymerization systems, dehydrogenated tall oil amine substantially free of emulsion polymerization inhibitors and abietylamine.

4. The process of preparing an amine of a stabilized tall oil substantially free of emusion polymerization inhibitors which comprises contacting a stabilized tall oil nitrile of the group consisting of hydrogenated tall oil nitrile containing substantially no abietonitrile and dehydrogenated tall oil nitrile containing substantially no abietonitrile with hydrogen under hydrogenation conditions in the presence of a hydrogenation catalyst.

5. The process of preparing an amine of a stabilized tall oil substantially free of emulsion polymerization inhibitors which comprises contacting a stabilized tall oil nitrile of the group consisting of hydrogenated tall oil nitrile containing substantially no abietonitrile and dehydrogenated tall oil nitrile containing substantially no abietonitrile with hydrogen under hydrogenation conditions in the presence of an active base metal hydrogenation catalyst.

6. The process of preparing an amine of a stabilized tall oil substantially free of emulsion polymerization inhibitors which comprises contacting a stabilized tall oil nitrile of the group consisting of hydrogenated tall oil nitrile containing substantially no abietonitrile and dehydrogenated tall oil nitrile containing substantially no abietonitrile with hydrogen under hydrogenation conditions in the presence of Raney nickel.

7. The process of preparing hydrogenated tall oil amine substantially free of emulsion polymerization inhibitors which comprises contacting hydrogenated tall oil nitrile substantially free of abietonitrile with hydrogen under hydrogenation conditions in the presence of Raney nickel.

8. The process of preparing dehydrogenated tall oil amine substantially free of emulsion polymerization inhibitors which comprises contacting dehydrogenated tall oil nitrile substantially free of abietonitrile with hydrogen under hydrogenation conditions in the presence of Raney nickel.

STEARNS T. PUTNAM.

REFERENCES CITED

The following references are of record in the file of this patent:

UNITED STATES PATENTS

| Number | Name | Date |
|---|---|---|
| 2,165,515 | Schmidt | July 11, 1939 |
| 2,194,906 | Krzikalla | Mar. 26, 1940 |
| 2,371,230 | Dressler | Mar. 13, 1945 |
| 2,434,656 | Humphrey | Jan. 20, 1948 |
| 2,461,349 | Ralston | Feb. 8, 1949 |
| 2,503,268 | Hasselstrom et al. | Feb. 11, 1950 |